(12) United States Patent
Zhou et al.

(10) Patent No.: US 10,498,733 B2
(45) Date of Patent: Dec. 3, 2019

(54) SECURE TRANSFER OF AUTHENTICATION INFORMATION

(71) Applicant: WALLIX, Paris (FR)

(72) Inventors: Raphaël Zhou, Choisy le Roi (FR); Serge Adda, Antony (FR)

(73) Assignee: Wallix, Paris (FR)

( * ) Notice: Subject to any disclaimer, the term of this patent is extended or adjusted under 35 U.S.C. 154(b) by 94 days.

(21) Appl. No.: 15/554,178

(22) PCT Filed: Mar. 3, 2016

(86) PCT No.: PCT/FR2016/050482
§ 371 (c)(1),
(2) Date: Aug. 28, 2017

(87) PCT Pub. No.: WO2016/139427
PCT Pub. Date: Sep. 9, 2016

(65) Prior Publication Data
US 2018/0083966 A1 Mar. 22, 2018

(30) Foreign Application Priority Data
Mar. 3, 2015 (FR) ...................... 15 51784

(51) Int. Cl.
G06F 7/04 (2006.01)
G06F 15/16 (2006.01)
G06F 17/30 (2006.01)
H04L 29/06 (2006.01)
G06F 21/41 (2013.01)
G06F 21/44 (2013.01)

(52) U.S. Cl.
CPC .......... *H04L 63/0884* (2013.01); *G06F 21/41* (2013.01); *G06F 21/44* (2013.01); *H04L 63/083* (2013.01); *H04L 63/0815* (2013.01)

(58) Field of Classification Search
USPC .......................................... 726/7
See application file for complete search history.

(56) References Cited

U.S. PATENT DOCUMENTS

2005/0015490 A1* 1/2005 Saare .................. H04L 63/0815
709/225
2014/0020072 A1 1/2014 Thomas
2015/0304292 A1* 10/2015 Dulkin ................ H04L 63/0281
726/7

* cited by examiner

Primary Examiner — Jeffrey C Pwu
Assistant Examiner — Samuel Ambaye
(74) Attorney, Agent, or Firm — Harness, Dickey & Pierce, PLC

(57) ABSTRACT

A secure method connects to an application run on a server from a client computer device, by a user who does not have the authentication data of the account declared in the application, the account including at least one proxy ID. The disclosure also relates to the application and associated authentication data, implementing a proxy [mandatary gateway] including a memory for recording, for each user declared by a primary account comprising at least one user ID, the list of resource targets C and accounts to which the user has access.

16 Claims, 2 Drawing Sheets

SECURE TRANSFER OF AUTHENTICATION INFORMATION

CROSS-REFERENCE TO RELATED APPLICATIONS

This application is a National Phase Entry of International Patent Application No. PCT/FR2016/050482, filed on Mar. 3, 2016, which claims priority to French Patent Application Serial No. 1551784, filed on Mar. 3, 2015, both of which are incorporated by reference herein.

TECHNICAL FIELD

The present invention relates to the field of application servers, and more particularly to methods and systems for the accessing of application resources, hosted on one or more servers, by a user.

BACKGROUND

International patent application WO 2014064686, in particular, is known in the state of the art and describes a system and method for secure authentication that is based on a proxy gateway. This document discloses a system and a method for secure authentication facilitating the improvement of the security of an authentication between a client and a target by means of an innovative authentication module on a proxy gateway. According to the invention, the client is able to connect to the proxy gateway by means of a native protocol, and provides user identification information to the proxy gateway.

The invention facilitates the connection between the client and the target such that there is no need, for the user, to be in possession of the identification information for target access. The proxy gateway may possibly be connected to a privileged access management system, which may provide and/or store target access identification information. The target access identification information, which information is provided by the proxy gateway, facilitates prevention against a flaw in the client's security that exposes the target access identification information.

The solution proposed by patent application WO2014064686 does not relate explicitly to a secure method for accessing applications, but only infrastructure resources such as a server or a router. Said patent application relates to the accessing of a target, corresponding expressly to a server, and not an application hosted by a server.

SUMMARY

The object of the present invention is not only to secure access to a server, but more precisely to secure access to applications hosted on a server, in order to enable, for example, use on a shared account by a plurality of users, while retaining the imputability of the actions carried out under this account. To this end, the invention relates, according to its most general interpretation, to a secure method for connecting to an application executed on a server from a client computer device, by a user not having authentication data for the account declared in said application, said account comprising at least one identity $ID_{proxy,\ application}$ and associated authentication data, implementing a proxy [proxy gateway] comprising a memory for recording, for each user declared by a primary account comprising at least one identity $ID_{user}$, the list of the targets $C_{resources,\ accounts}$ to which said user has access, the method comprising the following steps:

opening, by the user, of a connection to a proxy by means of a multi-channel native administration protocol [SSH, RDP or ICA, etc.], with a first identity $ID_{user}$ in order to open a primary multi-channel session simultaneous [in the connection parameters] or sequential [selection after opening of the connection from a list proposed by the proxy] definition of the application (target)

connection of the proxy to the host server of said selected application by means of the same multi-channel native administration protocol [SSH, RDP or ICA, etc.] with a second identity $ID_{proxy,\ server}$ in order to open a secondary multi-channel session temporary recording of an item of information $I_{relay}$ corresponding to the link between said primary session and said secondary session execution, on the server, of a computer code [script] opening a channel between said server and said proxy, in the framework of said secondary session sending, via said code on said channel, of a request demanding, for said application and said account, the authentication data [password]

in response to this request, transmission, by the proxy, of these authentication data if the target defined by said application and said account belongs to the list of the targets $C_{resources,\ accounts}$ that are recorded for said user and execution of said application and transmission, to said application, via said code, of the user data, or error notification if the account does not belong to said list. One of the advantages of this method is that the application may then be used by virtue of the same connection as that which served to access the gateway.

Advantageously, the method furthermore includes a step of selecting an application server from a plurality of servers hosting the same application. According to one particular mode of implementation, said computer code is recorded on the application server. Said computer code is preferably recorded by the proxy on said application server with a one-time name. According to one variant, said computer code recorded on the application server contains a one-time token that is transmitted with said request.

The application is preferably able to be used by two different users having the identities $ID_{user\ A}$ and $ID_{user\ B}$. To this end, each of the secondary sessions is executed with a different identity ($ID_{proxy,server\ A}$ and $ID_{proxy,server\ B}$). These identities are chosen automatically by the proxy from the identities that are configured in such a way as never to have two secondary sessions with the same identity at the same time.

BRIEF DESCRIPTION OF THE DRAWINGS

The present invention will be better understood upon reading the following description, with reference to non-limiting exemplary embodiments that are illustrated by the appended drawings, in which.

DETAILED DESCRIPTION

Functional Architecture

Figure 1:
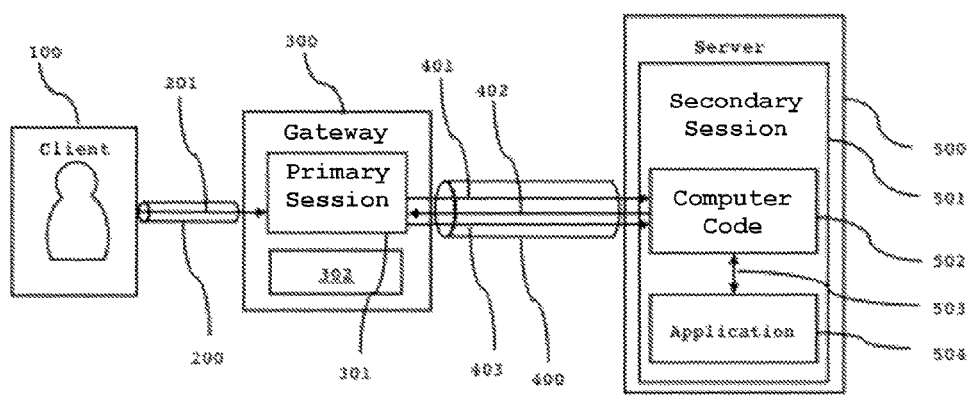
FIG. 1 shows a schematic of the functional architecture of the invention.

The user is a resource administrator of an information system (SI) (servers, applications, routers, etc.) having limited administrator rights, for a set of resources for which he is responsible. Said user has a terminal (100) communicating with the proxy gateway (300) (or 'administration gateway') by way of a channel (201) of a connection (200) in accordance with, for example, an SSH ('secure shell') or RDP ('remote desktop protocol') protocol. The connection leads to the creation of a primary session (301) on the gateway (300). The user is identified by digital identifiers that are specific to him and define his rights, and also the imputation of the actions that he performs. The gateway (300) includes a database (302) in which are recorded the identifiers of the authorized users, and also the associated rights, defining the targets (accounts and devices) on which the user is entitled to act.

Upon connection, two resource selection modes are possible:

in the first mode, the user specifies, upon connection, the target that he wishes to access. In this case, the gateway verifies whether the user identified by his identifier has the authorizations necessary to access this target, depending on the information recorded in the database (302).

in the second mode, the gateway transmits, to the user, the list of the targets corresponding to the data recorded in the database (302) in relation to the transmitted identifier, in order to enable the user to select one of the proposed targets.

The following step consists in opening a connection (400), generally using the same SSH or RDP protocol, or else using a second protocol, to the account associated with the selected target. This connection opens a secondary session (501) on the target. When the target is an application (504), the gateway (300) chooses the server (500) appropriate for executing said application. To this end, the database (302) comprises a list of the applications and of the servers hosting each of said applications, and also the accounts making it possible to connect to these servers.

When a plurality of servers host one and the same application, the gateway balances the loads depending on the number of connections that are already open to each of the servers, and selects the least congested server for the new request. Likewise, in the absence of a response by a server hosting an application, the gateway successively searches the other servers hosting the same application, in order to select an available target.

The following step consists in executing a computer code (502) in order to:

interrogate the gateway (request 402) with a view to obtaining the authentication information corresponding to the account of the application, that is to say the identifier $ID_{proxy;application}$ and also the authentication data associated with this account, for example a password or a cryptographic certificate, or a Kerberos ticket. These data are returned by the gateway (response 403). The request and the response are performed in a channel opened for this purpose by the computer code.

inject these data (503) into the application (504) in order to open an application session and enable the user to use said application.

This code may be:

installed on the server (500) permanently. In this case, the path for accessing this code is defined in the database (302) or transmitted transiently, by a dedicated channel (401) provided in the multi-channel protocol, in order to be executed transiently on the server (500).

The name of this code may be generated in a unique manner, in order to make it more difficult to alter this code by way of a cyber-attack during the execution of the application. This transiently installed code may also include a unique token in order to reduce the risks of unauthorized access to the data recorded in the base (302), by means of the open session, by an attacker with access to the server (500).

Figure 2:
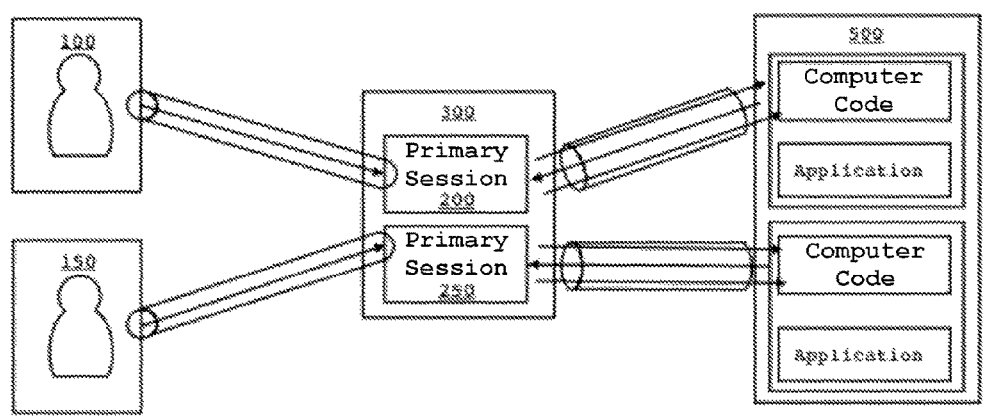
FIG. 2 shows a schematic of the functional architecture of a variant embodiment of the invention.

Concurrent Access to Applications on One and the Same Server by a Plurality of Users FIG. 2 shows a functional schematic of a solution enabling a plurality of users to access applications hosted on one and the same server. The aim is to avoid interference between the primary sessions (200 and 250), and to make them safe in terms of security. To this end, when a second user (150) attempts to execute an application hosted on the same server (500) as an application executed for a first user (100), the gateway (300) will block the data from the base (302) that relate to the account used by the first user (100) on the server (500). It will authorize the execution of an application on this same server (500) only if an account remains available for a second user (150).

Data Exchanged Between the Computer Resources

Figure 3:
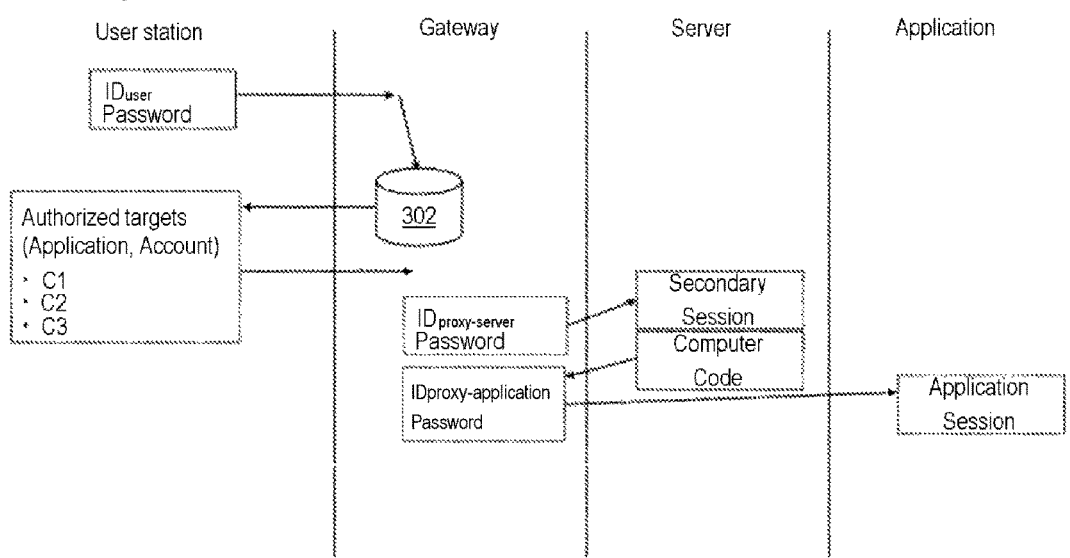
FIG. 3 shows a schematic view of the data exchanged between the various computer resources.

FIG. 3 shows a schematic view of the data exchanged between the various computer resources. Upon connection by a user, the terminal (100) transmits, to the proxy gateway (300), the following digital authentication data:

$ID_{user}$

Password.

These authentication data may be formed, instead of the password, of a Kerberos ticket or of an X509 certificate. These authentication data are verified by the gateway (300), depending on the information recorded in its database (302). In the event of validation, the gateway (302) transmits the list of authorized targets. Each target corresponds to a pair:

application account associated with the application.

The account comprises:

an item of identification information an item of authentication information, such as a password.

The gateway transmits, to the user (100), for each of the authorized targets, only the designation of the application and the designation of the identifier of the account, but not the item of authentication information, in the form of strings of characters designating the application/account pairs. The user (100) selects one of the proposed targets, and transmits the identifier thereof to the gateway (300). The gateway (300) chooses a server and an account to open a session on said server (500) in accordance with the process for selecting the server and the account described previously.

It thus opens a secondary session, on the server, by executing the computer code corresponding to the application. This code demands, at the gateway, the identifier of the account of the application, and also the authentication data associated with this account. The computer code then transmits this information to the application in order to control the execution of the application. The invention enables the computer code to interrogate the gateway without requiring any new authentication by the user, as it does this by way of a connection that is already authenticated.

The invention claimed is:

1. A secure method for connecting to an application executed on a server from a client computer device, by a user not having authentication data for an account declared in the application, the account comprising at least one identity IDproxy, application and associated authentication data, implementing a proxy comprising a memory for recording, for each user declare by a primary account comprising at least one identity IDuser, a list of targets Cresources, accounts to which the user has access, the method comprising: opening, by the user, of a connection to the proxy by a multi-channel native administration protocol, with a first identity IDuser in order to open a primary multi-channel session; simultaneous or sequential definition of the application; connection of the proxy to the server of the application by the same multi-channel native administration protocol with a second identity IDproxy,server in order to open a secondary multi-channel session; temporary recording of an item of information Irelay corresponding to a link between the primary multi-channel session and the secondary multi-channel session; execution, on the server, of a computer code opening a channel between the server and the proxy, in framework of the secondary multi-channel session; sending, via the computer code on the channel, of a request demanding, for the application and the account, the authentication data; in response to this request, transmission, by the proxy, of these authentication data if a target defined by the application and the account belongs to the list of targets Cresources, accounts, associated with an identifier ID proxy, application, that is recorded for the user; and execution of the application and transmission, to the application, via the computer code, of the authentication data of the user, or error notification if the account does not belong to the list; wherein the instructions are recorded onto the server by the proxy gateway using a one-time name; and wherein the instructions are recorded on the server using a one-time token that is transmitted with the request.

2. The secure method for connecting to the application as claimed in claim 1, further comprising selecting an application server from a plurality of servers hosting the same application.

3. The secure method for connecting to the application as claimed in claim 1, wherein the computer code is recorded on an application server.

4. The secure method for connecting to the application as claimed in claim 3, wherein the application is able to be used by two different users having the identities IDuserA and IDuserB, to this end, each of the secondary multi-channel sessions is executed with a different identity (IDproxy,server A and IDproxy,server b), the identities being chosen automatically by the proxy from the identities that are configured in such a way as never to have two secondary multi-channel sessions with the same identity at the same time.

5. A secure system for connecting to an application, comprising: (a) a terminal of a client computing device configured to: (i) open a first connection, via a first channel, with a proxy gateway using an authorized user identifier; and (ii) generate a primary session on the proxy gateway; (b) the proxy gateway including a database for storing authorized user identifiers, wherein each authorized user is associated with a list of targets, wherein the proxy gateway is configured to: (i) in response to receiving a user indication of a target from the terminal, open a second connection, via a second channel, to a server associated with the target using a proxy identifier to generate a secondary session, wherein, when the target is a first application of a plurality of applications, the server is selected based on the server including the first application for execution; (c) the server being configured to: (i) in response to a request from the server, obtain access permissions of the proxy identifier by identifying a first user identifier of the authorized user identifiers from the database of the proxy gateway; and (ii) temporarily record instructions that, upon receipt of the list of targets associated with the first user identifier, cause the server to: (1) in response to the list of targets of the first user identifier including the first application, execute the first application on the server within the secondary session; and (2) in response to the first application being excluded from the list of targets of the first user identifier, generate and send an error message, (3) wherein the instructions are transmitted by the proxy gateway; wherein the instructions are recorded onto the server by the proxy gateway using a one-time name; wherein the instructions are recorded on the server using a one-time token that is transmitted with the request.

6. The secure system of claim 5 wherein receiving the user indication of the target includes: (i) user input received from the terminal indicating the target; or (ii) in response to the user input excluding the target: (1) prompting, via the terminal, a user with the list of targets associated with the first user identifier, wherein the first user identifier corresponds to the user; and (2) receiving a user selection of the target from the list of targets.

7. The secure system of claim 5 wherein the first connection and the second connection implement secure shell or remote desktop protocol.

8. The secure system of claim 5 further comprising a plurality of servers including the first application, wherein the proxy gateway is further configured to identify the server from the plurality of servers based on a number of connections presently open with the server.

9. The secure system of claim 8 wherein the server has a lowest number of present connections.

10. The secure system of claim 5 wherein the instructions are recorded onto the server.

11. A secure method for connecting to an application, comprising:
(a) opening a first connection, via a first channel, between a terminal and a proxy gateway using an authorized user identifier; (b) generating a primary session on the proxy gateway, wherein the proxy gateway includes a database for storing authorized user identifiers, wherein each authorized user is associated with a list of targets; (c) in response to receiving a user indication of a target from the terminal, opening a second connection, via a second channel, to a server associated with the target using a proxy identifier to generate a secondary session, wherein, when the target is a first application of a plurality of applications, the server is selected based on the server including the first application for execution; (d) in response to a request from the server, obtaining access permissions of the proxy identifier by identifying a first user identifier of the authorized user identifiers from the database of the proxy gateway; and (e) temporarily recording instructions that, upon receipt of the list of targets associated with the first user identifier, cause the server to: (i) in response to the list of targets of the first user identifier including the first application, execute the first application on the server within the secondary session; and (ii) in response to the first application being excluded from the list of targets of the first user identifier, generate and send an error message, (iii) wherein the instructions are transmitted by the proxy gateway; wherein the instructions are recorded onto the server by the proxy gateway using a one-time name; wherein the instructions are recorded on the server using a one-time token that is transmitted with the request.

12. The secure method of claim 11 wherein receiving the user indication of the target includes: (a) user input received from the terminal indicating the target; or (b) in response to the user input excluding the target: (i) prompting, via the terminal, a user with the list of targets associated with the first user identifier, wherein the first user identifier corresponds to the user; and (ii) receiving a user selection of the target from the list of targets.

13. The secure method of claim 11 wherein the first connection and the second connection implement secure shell or remote desktop protocol.

14. The secure method of claim 11 further comprising a plurality of servers including the first application, wherein the proxy gateway is further configured to identify the server from the plurality of servers based on a number of connections presently open with the server.

15. The secure method of claim 14 wherein the server has a lowest number of present connections.

16. The secure method of claim 11 wherein the instructions are recorded onto the server.

* * * * *